June 25, 1940.   G. SCHWEITZER   2,205,866
CAPACITIVE RADIO FREQUENCY VOLTAGE DIVIDER
Filed Nov. 26, 1937
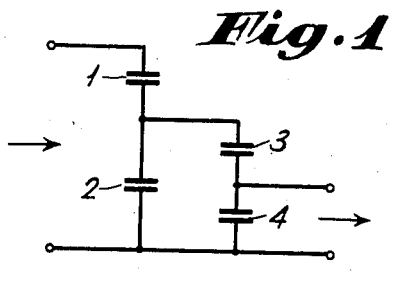
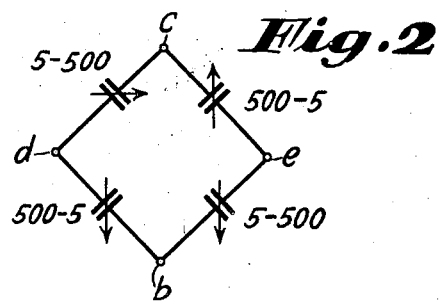
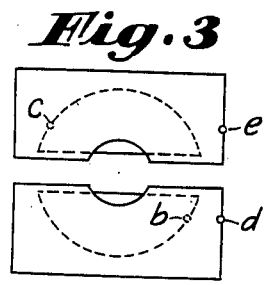
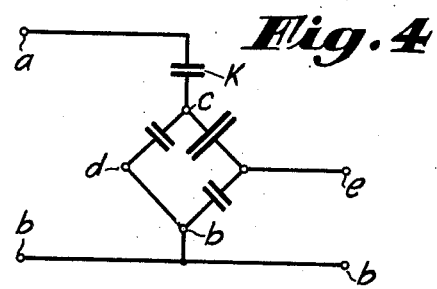
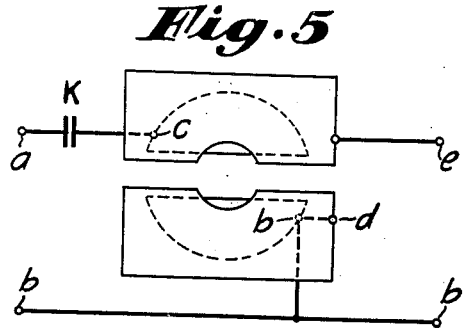
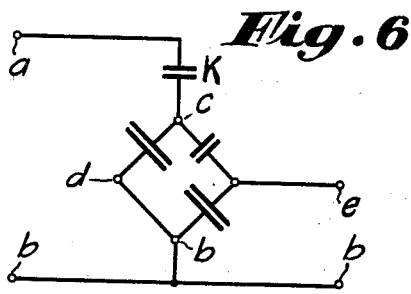
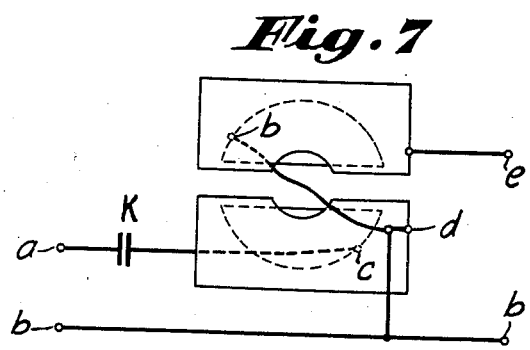
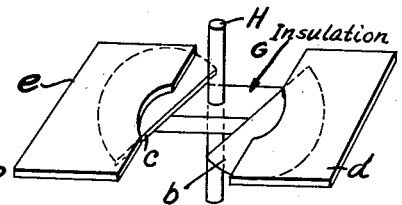
INVENTOR
GERHARD SCHWEITZER
BY
ATTORNEY Patented June 25, 1940

2,205,866

UNITED STATES PATENT OFFICE 2,205,866

CAPACITIVE RADIO FREQUENCY VOLTAGE DIVIDER

Gerhard Schweitzer, Berlin, Germany, assignor to Telefunken Gesellschaft für Drahtlose Telegraphie m. b. H., Berlin, Germany, a corporation of Germany Application November 26, 1937, Serial No. 176,771
In Germany December 9, 1936

5 Claims. (Cl. 178—44)

This invention relates to a new and novel adjustable capacitive voltage divider for measuring radio frequency voltages over a wide voltage range and is especially adapted for measuring the voltage of radio transmitters.

A problem to be solved is how to create a regulator device for radio voltage covering a frequency range from 1 to $10^6$.

A practical solution of the problem mentioned above is obtained by employing in a circuit two groups of condensers in which simultaneously three capacitive units of the group may be varied. One capacitive member is lacking and its equivalent is replaced by a circuit combination of the others. This invention has been tried out in the laboratory; it is already carried into actual practice in the desk type measuring transmitter.

This invention will best be understood by referring to the accompanying drawing, in which:

Fig. 1 is a circuit diagram of two groups of capacitive voltage dividers;

Fig. 2 is a bridge circuit diagram of four variable capacitors;

Fig. 3 is a structural arrangement of the four capacitors of Fig. 2;

Fig. 4 is a bridge circuit diagram of two groups of capacitors of this invention;

Fig. 5 is a structural arrangement of the capacitors shown in Fig. 4;

Fig. 6 is another bridge circuit diagram of four variable capacitors;

Fig. 7 is a structural arrangement of two groups of capacitors shown diagrammatically in Fig. 6; and Fig. 8 is a perspective view showing an arrangement of supporting the rotor plates on a common insulating member.

The radio frequency potential which is taken from a measuring transmitter, or is to be supplied to a receiver, must frequently be variable inside wide limits. It is known in the art to use for such regulation or adjustment a capacitive voltage divider which comprises two series-connected capacities and of which at least one is variable.

However, occasionally the regulation range of such a voltage divider proves inadequate or else detuning of the measuring transmitter occurs whenever variation within wide limits is attempted. This difficulty is obviated by connecting another variable capacitive voltage divider in parallel relation to the output terminals of the first variable capacitive voltage divider, with the regulable members of the two voltage dividers being conveniently coupled mechanically.

One advantageous embodiment of the invention is to use a rotary condenser comprising two stators and two rotors and thus have four variable capacities, in such a way that two of these capacities $c$, $d$ and $d$, $b$ with a joint stator $d$ or joint rotor, one of which capacities $d$, $b$ is short-circuited, form the output capacity of the first voltage divider, while the two other capacities $c$, $e$ and $e$, $b$ constitute the second voltage divider with the other joint stator $e$ or rotor.

A condenser of this kind is well known in the art and is sold in the market, though it has in the past been used only as a symmetric tuning condenser.

The invention shall be described more fully in what follows by reference to the appended drawing.

Referring to Fig. 1 of the drawing, the condensers of the first voltage divider are denoted by 1 and 2, and those of the second voltage divider are designated by 3 and 4. The rotary condenser structure which is to be used according to the present invention is illustrated in Fig. 3, while the corresponding equivalent diagram is shown in Fig. 2. The two rotors in both figures are designated by $b$ and $c$, and the stators by $d$ and $e$. Each capacity surface is insulated from the other. The rotors are mounted as shown by Fig. 8 upon a common spindle H and are insulated therefrom by insulation G, and they are arranged to be turned from one stator into and to interleave with the other. In Fig. 2, the assumption is made that the capacities are variable from 5 up to 500 micro-microfarad. The four variable capacities are as follows: Rotor $c$ to stator $e$, rotor $c$ to stator $d$, rotor $b$ to stator $d$, and rotor $b$ to stator $e$.

The condenser of the invention is used, for instance, as shown in Figs. 4 and 5. Capacity $db$ is short-circuited by connecting the stator and rotor plates together, and the capacity $cd$ serves as a variable capacity of the first voltage divider connected across terminals $a$ and $b$. The capacity K of the first voltage divider, for example, is invariable and amounts, for instance, to 5 mmf. The two other variable capacities $ce$ and $eb$ constitute the second voltage divider. In Figs. 4 and 5 is shown the position of the condenser for the highest potential. The increased size of the capacities is indicated in Fig. 4 by a corresponding increase in size of the symbols or reference letters. In other words, the capacitor indicated by a symbol between $c$ and $e$ is large, and the reference letter K is large also.

In Figs. 6 and 7 is shown the other position, namely, for the lowest potential that is taken off. In this instance, large capacities and correspondingly low potentials are placed between terminals *cd* and *eb*.

In the two limiting positions, upon change of a rotor in reference to a stator ranging between 5 and 500 micro-microfarads, the following divisions are feasible.

Position Figs. 4 and 5: Output potential equal to one-half input potential.

Position Figs. 6 and 7: Output potential equal to 1/10,000 the input potential.

This means a variation of 1:5000. Inasmuch as condensers of this kind may be made even with substantially greater final (output) capacities with nearly the same input capacity, it follows that this range of variation may be increased still further to a considerable extent. In fact, it is thus feasible to obtain radio frequency potentials at a ratio of $1:10^6$.

The regulator arrangement as here disclosed offers the further advantage that by the operation of a single rotary knob the condenser group comprising the two condenser units may be accurately adjusted in the desired sense, and that the same may be calibrated.

What is claimed is:

1. An adjustable capacitive voltage measuring device for measuring radio frequency voltages over a wide frequency range, comprising an input circuit and an output circuit, a first and a second variable capacitor each having a group of rotor and stator plates, the rotor and stator plates of the first capacitor group being located in the same plane and spaced apart from the second group, the rotor plates of the first capacitor group being electrically insulated from the second group and mechanically coupled together for rotation to interleave the stator plates of each capacitor group as they are rotated, a fixed capacitor connected in series with one side of said input circuit and the group of rotor plates of said first variable capacitor which with its group of stator plates forms a first voltage divider, a connection from the group of stator plates of said first variable capacitor to one side of said output circuit, a connection between the group of rotor and stator plates of said second variable capacitor forming a second voltage divider, and a connection from said group of rotor and stator plates of said second variable capacitor to the other side of both the input and output circuits.

2. An adjustable capacitive voltage measuring device for measuring radio frequency voltages over a wide frequency range, comprising an input circuit and an output circuit each circuit having a pair of terminals, a first and a second variable capacitor each having a group of rotor and stator plates, the rotor and stator plates of the first capacitor group being located in the same plane and spaced apart from the second group, a fixed capacitor connected in series with one terminal of said input circuit and the first group of rotor plates, a connection from the stator plates of said first capacitor to one terminal of the output circuit, means for electrically insulating the rotor plates of said first and second variable capacitors, means for rotating the rotor plates of both variable capacitors to interleave the stator plates of said first and second capacitors as said rotor plates are rotated, a connection between the rotor and stator plates of said variable second capacitor, and a connection from said second stator plates to the other terminal of both the input and output circuits.

3. An adjustable capacitive voltage measuring device for measuring radio frequency voltages over a wide frequency range, comprising an input circuit and an output circuit, a first and a second variable capacitor each having a group of rotor and stator plates, the rotor and stator plates of the first capacitor group being located in the same plane and spaced apart from the second group, a common shaft for rotating the rotor plates of both variable capacitors, means for insulating the rotor plates of said first and second variable capacitors from each other, said common shaft being located in the space between the group of rotor and stator plates of both variable capacitors to interleave the stator plates of each capacitor group as they are rotated, a fixed capacitor connected in series with one side of said input circuit and the group of rotor plates of said first variable capacitor which with its group of stator plates forms a first voltage divider, a connection from the group of stator plates of said first variable capacitor to one side of said output circuit, a connection between the group of rotor and stator plates of said second variable capacitor forming a second voltage divider, and a connection from said group of rotor and stator plates of said second variable capacitor to the other side of both the input and output circuits.

4. An adjustable capacitive voltage measuring device for measuring radio frequency voltages over a wide frequency range, comprising an input circuit and an output circuit, a first and a second variable capacitor each having a group of rotor and stator plates, the rotor and stator plates of the first capacitor group being located in the same plane and spaced apart from the second group, the rotor plates of the first capacitor group being electrically insulated from the second group and mechanically coupled together for rotation to interleave the stator plates of each capacitor group as they are rotated, a fixed capacitor connected in series with one side of said input circuit and the group of rotor plates of said first variable capacitor which with its group of stator plates forms a first voltage divider, a connection from the group of stator plates of said first variable capacitor to the group of rotor plates of said second variable capacitor, the stator plates of said second group having a connection to one side of said output circuit forming a second voltage divider, and a connection between the group of stator plates of said first variable capacitor to the other side of both the input and output circuits.

5. An adjustable capacitive voltage measuring device for measuring radio frequency voltages over a wide frequency range, comprising an input circuit and an output circuit each circuit having a pair of terminals, a first and a second variable capacitor each having a group of rotor and stator plates, the rotor and stator plates of the first capacitor group being located in the same plane and spaced apart from the second group, a fixed capacitor connected in series with one terminal of said input circuit and the first group of rotor plates, means for electrically insulating the rotor plates of said first and second variable capacitors, means for rotating the rotor plates of both variable capacitors to interleave the stator plates of said first and second capacitors as said rotor plates are rotated, a connection between the stator of said first variable capacitor and the rotor of said second variable capacitor, a connection from the stator plates of said second variable capacitor to one output terminal, and a connection from the other terminals of both the input and output circuits.

GERHARD SCHWEITZER.